(12) United States Patent
Sharma (10) Patent No.: US 11,747,500 B2
(45) Date of Patent: Sep. 5, 2023

(54) SEISMIC DATA ACQUISITION FOR VELOCITY MODELING AND IMAGING

(71) Applicant: PGS Geophysical AS, Oslo (NO)

(72) Inventor: Arvind Sharma, Houston, TX (US)

(73) Assignee: PGS Geophysical AS, Oslo (NO)

( * ) Notice: Subject to any disclaimer, the term of this patent is extended or adjusted under 35 U.S.C. 154(b) by 930 days.

(21) Appl. No.: 16/103,867

(22) Filed: Aug. 14, 2018

(65) Prior Publication Data

US 2019/0064380 A1   Feb. 28, 2019

Related U.S. Application Data

(60) Provisional application No. 62/551,275, filed on Aug. 29, 2017.

(51) Int. Cl.
*G01V 1/38* (2006.01)

(52) U.S. Cl.
CPC .......... *G01V 1/3808* (2013.01); *G01V 1/3852* (2013.01); *G01V 2210/127* (2013.01); *G01V 2210/1293* (2013.01); *G01V 2210/1423* (2013.01); *G01V 2210/1427* (2013.01)

(58) Field of Classification Search
CPC .............. G01V 1/3808; G01V 1/3852; G01V 2210/127; G01V 2210/1293; G01V 2210/1423; G01V 2210/1427
See application file for complete search history.

(56) References Cited

U.S. PATENT DOCUMENTS

| 2,757,358 | A | | 7/1956 | Haggerty |
| 4,970,696 | A | * | 11/1990 | Crews ............... G01V 1/003 367/15 |
| 6,925,386 | B2 | | 8/2005 | Pramik et al. |

(Continued)

FOREIGN PATENT DOCUMENTS

| GB | 2394051 A | 4/2004 |
| GB | 2404025 A | 1/2005 |

(Continued)

OTHER PUBLICATIONS

Rhonda Duey, "All In One, Vessel deploys streamers and nodes while providing sources," E&P Nov. 2017, 1 page.

(Continued)

*Primary Examiner* — Krystine E Breier
(74) *Attorney, Agent, or Firm* — Patterson + Sheridan, LLP (57) ABSTRACT

A method and apparatus for data acquisition including: acquiring a first set of data for a survey area with streamer receivers on a streamer spread; and simultaneously acquiring a second set of data for the area with ocean bottom receivers, the first and second sets of data together forming a complete dataset for velocity modeling and imaging. A method including: navigating a first propulsion source along a first path in the area, wherein a streamer spread and a first seismic source are coupled to the first propulsion source; navigating a second propulsion source along a second path in the area, wherein a second seismic source is coupled to the second propulsion source; while navigating the first and second propulsion sources, activating at least one of the first and second seismic sources; and acquiring data with receivers on the streamer spread and with ocean bottom receivers distributed throughout the area.

18 Claims, 7 Drawing Sheets

(56) References Cited

U.S. PATENT DOCUMENTS

| | | | |
|---|---|---|---|
| 7,123,543 B2* | 10/2006 | Vaage | G01V 1/364 367/24 |
| 9,075,162 B2 | 7/2015 | Baardman et al. | |
| 9,261,619 B2* | 2/2016 | Mandroux | G01V 1/3808 |
| 9,310,503 B2* | 4/2016 | Rentsch | G01V 1/36 |
| 9,360,575 B2* | 6/2016 | Etienne | G01V 1/3852 |
| 9,405,029 B2* | 8/2016 | Howieson | G01V 1/3808 |
| 9,429,667 B2 | 8/2016 | Vyas et al. | |
| 9,651,695 B2 | 5/2017 | Lu et al. | |
| 9,733,376 B2* | 8/2017 | Landais | G01V 1/3808 |
| 10,073,184 B2* | 9/2018 | Faber | G01V 1/288 |
| 10,094,942 B2* | 10/2018 | Brenders | G06F 17/10 |
| 10,267,939 B2* | 4/2019 | Eick | G01V 1/302 |
| 10,479,455 B2* | 11/2019 | Toennessen | G05D 1/0027 |
| 10,627,534 B2* | 4/2020 | Bernitsas | G01V 1/3808 |
| 2009/0147620 A1* | 6/2009 | Pan | G01V 1/3808 367/21 |
| 2015/0078124 A1 | 3/2015 | Lu et al. | |
| 2015/0234065 A1 | 8/2015 | Lecocq et al. | |
| 2015/0241587 A1 | 8/2015 | Baardman | |
| 2015/0293250 A1 | 10/2015 | Baardman et al. | |
| 2016/0097870 A1* | 4/2016 | Routh | G01V 1/282 703/2 |
| 2016/0202378 A1* | 7/2016 | Ridsdill-Smith | G01V 1/3852 367/21 |
| 2016/0245941 A1 | 8/2016 | Ronholt et al. | |
| 2017/0168178 A1 | 6/2017 | Crawley et al. | |
| 2017/0176636 A1 | 6/2017 | Adams et al. | |
| 2018/0164457 A1 | 6/2018 | Beitz et al. | |

FOREIGN PATENT DOCUMENTS

| | | |
|---|---|---|
| WO | 2009131619 A2 | 10/2009 |
| WO | 2016011250 A1 | 1/2016 |
| WO | 2018217872 A1 | 11/2018 |

OTHER PUBLICATIONS

GB Search Report issued to GB1813957.6 dated Jan. 24, 2019.
United Kingdom Combined Search and Examination Report dated Apr. 1, 2022, for Application No. GB2203858.2.
United Kingdom Examination Report dated Nov. 8, 2021, for Patent Application No. GB1813957.6.

* cited by examiner

SEISMIC DATA ACQUISITION FOR VELOCITY MODELING AND IMAGING

CROSS REFERENCE TO RELATED APPLICATIONS

This application claims benefit of U.S. Provisional Patent Application Ser. No. 62/551,275, filed Aug. 29, 2017, entitled "Complete Velocity and Imaging Acquisition," which is incorporated herein by reference.

BACKGROUND

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and geophysical sensors or receivers—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby collect survey data which can be useful in the discovery and/or extraction of hydrocarbons from subsurface formations.

Data acquired during a marine survey may be interpreted according to a number of techniques. For example, marine survey data, especially wide-azimuth marine survey data, may be used to generate a velocity model, which may describe the spatial distribution of acoustic wave velocity through the subsurface. A velocity model may include constant-velocity units (layers), through which raypaths obeying Snall's law can be traced. A velocity model may be further used in data interpretation, for example in depth migration, which may be used to generate an image of the subsurface. Migration typically transforms seismic data, which may be acquired and/or recorded as a function of arrival time, into images of scaled features that are located at proper depth and location within the subsurface. Imaging may benefit from a dense set of narrow-azimuth/long-offset data.

Many data processing and/or interpretation techniques may generate and/or amplify noise in the acquired data. Robust and/or redundant datasets help to improve signal-to-noise ratios. However, acquiring additional data to form robust and/or redundant datasets for can be costly and time consuming. For example, ocean bottom receivers may be densely-spaced (e.g., typically about 400 m between adjacent receivers) to provide better data quality. However, operating costs increase with the number of receivers. Historically, towed-streamer surveys have struggled to match the repeatability of ocean bottom receiver surveys, being subject to variable current or wind conditions and surface obstructions. It would be beneficial to optimally acquire data while managing data acquisition costs.

BRIEF DESCRIPTION OF THE DRAWINGS

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "substantially" means within about +−10% variation. The term "nominal" means as planned or designed in the absence of variables such as wind, waves, currents, or other unplanned phenomena. "Nominal" may be implied as commonly used in the field of marine surveying.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the surveying operation. As another example, the two or more events may occur during time periods that overlap by about 40% to about 100% of either period.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine surveying methods and apparatuses, and, at least in some embodiments, to novel data acquisition configurations, and their associated methods of use.

One of the many potential advantages of the embodiments of the present disclosure is that multiple datasets may be acquired simultaneously. For example, in some embodiments, seismic data acquisition may simultaneously generate datasets with one or more long-offset towed streamer systems, one or more source vessel systems, and an ocean bottom receiver system. The simultaneously-acquired multiple datasets may together provide a collective dataset that can be used for both velocity modeling and for imaging. For example, data acquired with the ocean bottom receiver system may be useful for velocity modeling, and data acquired with receivers on the towed streamers may be useful for imaging. As used herein, a "complete dataset" refers to a set of seismic data that has sufficient information to be used for both velocity modeling and for imaging. Another potential advantage includes saving operational costs by acquiring the multiple datasets simultaneously. Another potential advantage includes saving operational costs by operating the various systems independently. For example, operation of each of the towed streamer systems independently of the other allows each tow vessel to navigate more efficiently in response to local sea conditions, survey plan, crew availability, etc. Embodiments of the present disclosure can thereby be useful in the discovery and/or extraction of hydrocarbons from subsurface formations.

Figure 1:
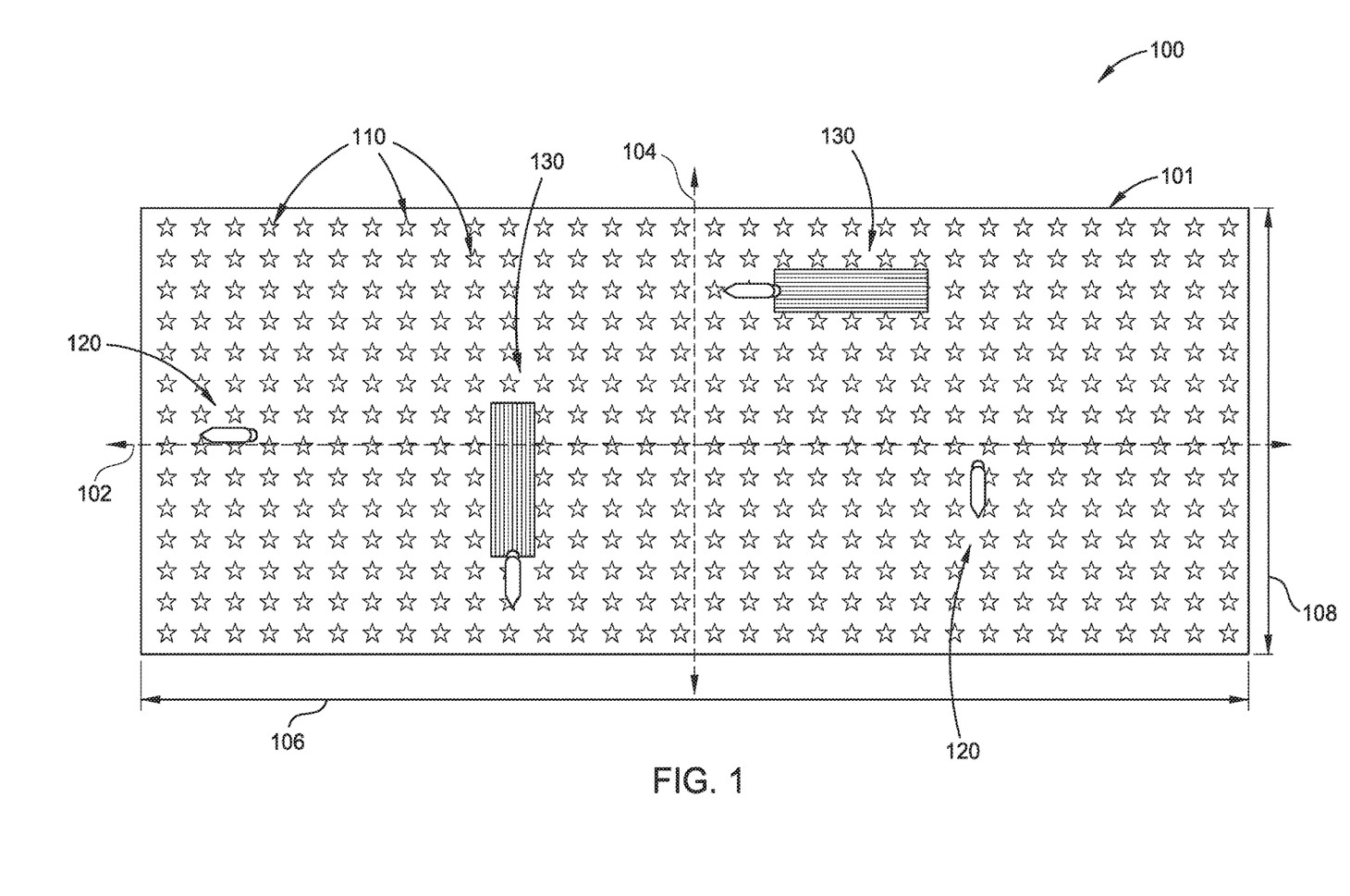
FIG. 1 illustrates an exemplary data acquisition configuration.

FIG. 1 illustrates an exemplary acquisition configuration 100. As illustrated, the survey area 101 of acquisition configuration 100 has a length 106 and a width 108. For example, the length 106 may be between about 50 km and about 200 km. The width 108 may be between about 10 km and about 100 km. In some embodiments, the length 106 and the width 108 may be substantially equal. A plurality of ocean bottom receivers 110 are distributed throughout the survey area 101. For example, the ocean bottom receivers 110 may be on ocean bottom nodes or ocean bottom cables. Each ocean bottom receiver 110 may be, for example, a hydrophone, a geophone, a pressure sensor, a particle velocity sensor, another type of seismic data receiver, and/or an array or combination thereof. It should be understood that the ocean bottom receivers 110 may be at or near the seafloor, for example within about 10 m of the seafloor. As illustrated, the ocean bottom receivers 110 can be distributed in a regular-rectangular pattern throughout the survey area 101. It should be understood that other distribution patterns may be utilized, including any distribution pattern that is applicable to marine surveying with ocean bottom receivers. As illustrated, the distribution pattern of the ocean bottom receivers 101 has a major axis 102 and a minor axis 104, each defining lines of symmetry in the distribution pattern of the ocean bottom receivers 110. In some embodiments, the major axis 102, the minor axis 104, and/or any other line of symmetry of the distribution pattern of the ocean bottom receivers 110 may be skewed relative to length 106 and/or width 108. In some embodiments, the ocean bottom receivers 110 may be spaced in a sparse-node distribution pattern. For example, the spacing between adjacent ocean bottom receivers 110 may be between about 0.5 km and about 3 km. In some embodiments, the spacing between adjacent ocean bottom receivers 110 parallel to major axis 102 may be the same as the spacing between adjacent ocean bottom receivers 110 parallel to minor axis 104. For example, the spacing between adjacent ocean bottom receivers 110 may be about 2 km in each direction. As another example, the spacing between adjacent ocean bottom receivers 110 parallel to major axis 102 may be about 2 km, while the spacing between adjacent ocean bottom receivers 110 parallel to minor axis 104 may be about 1 km.

Figure 2:
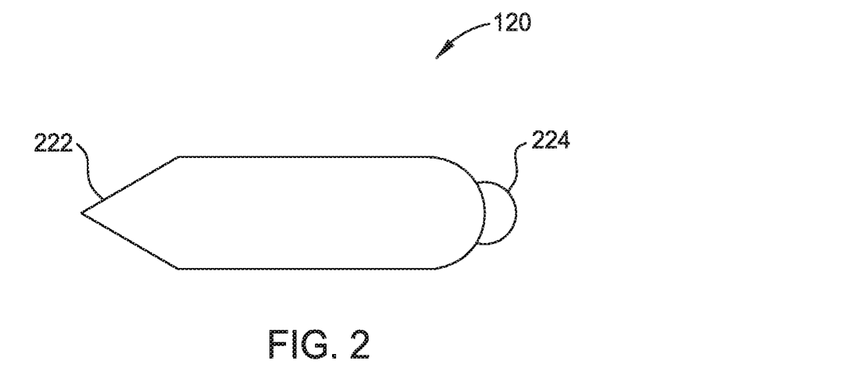
FIG. 2 illustrates a source vessel from the exemplary data acquisition configuration of FIG. 1.

As illustrated in FIG. 1, acquisition configuration 100 also includes a pair of source vessels 120. FIG. 2 illustrates source vessels 120 in more detail. Each source vessel 120 includes a propulsion source 222, such as a boat or a remotely operated vehicle, and a seismic source 224. For example, the seismic source 224 may be one or more air guns, marine vibrators, and/or combinations and arrays thereof. For example, in some embodiments, seismic source 224 may include, or be configured to act as, two independently-activated sources of seismic energy. (It should be appreciated that multiple independent sources of seismic energy on a vessel may allow for more closely-spaced source activations. For example, while one air gun is resetting, another may be firing.) Source vessel 120 may include additional equipment (not shown) to provide navigation, source control, data recording, and/or communications (e.g., with other components of acquisition configuration 100). Source vessel 120 may be capable of navigating along a nominal survey path under power of propulsion source 222 while activating seismic source 224 according to a nominal survey plan. Source vessel 120 may also be capable of recording locations of propulsion source 222 and/or timing of the activations of seismic source 224. Source vessel 120 may also be capable of communicating with other components of acquisition configuration 100, including communications regarding navigation and/or source activation. Although illustrated as being directly coupled in a fixed spatial relationship, seismic source 224 may be towed from propulsion source 222 (e.g., on a flexible source cable).

Figure 3:
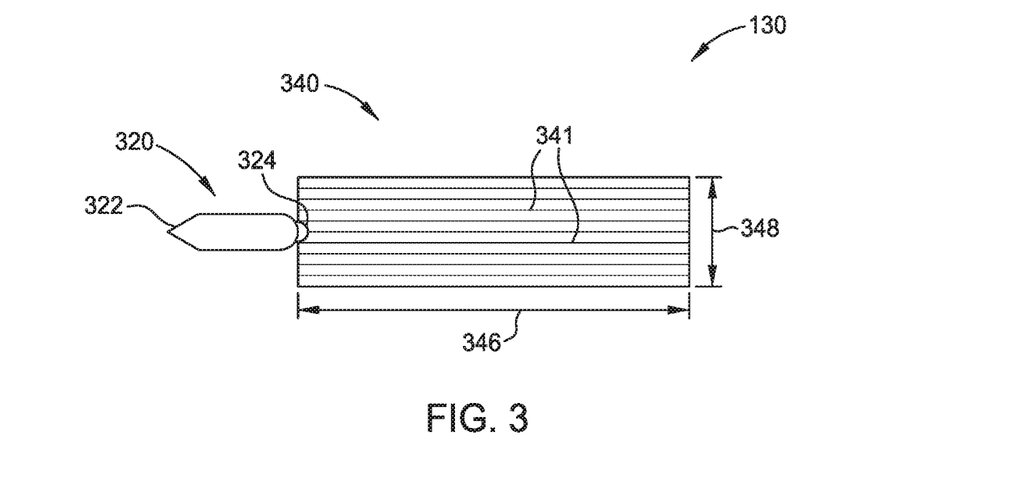
FIG. 3 illustrates a streamer vessel from the exemplary data acquisition configuration of FIG. 1.

As illustrated in FIG. 1, acquisition configuration 100 also includes a pair of streamer vessels 130. FIG. 3 illustrates streamer vessel 130 in more detail. Each streamer vessel 130 includes a source vessel 320, configured similarly to source vessel 120 (i.e., having a propulsion source 322 and a seismic source 324). Each streamer vessel 130 also includes a streamer spread 340. Streamer spread 340 includes a plurality of streamers 341 towed behind source vessel 320. As illustrated, the streamer spread 340 has a length 346 and a width 348. For example, the length 346 may be between about 6 km and about 12 km. The width 348 may be between about 1 km and about 2 km. Each streamer 341 may include a plurality of streamer receivers (not shown). Each streamer receiver may be, for example, a hydrophone, a geophone, a pressure sensor, a particle velocity sensor, another type of seismic data receiver, and/or an array or combination thereof. Streamer vessel 130 may include additional equipment (not shown) to provide navigation, source control, data recording, and/or communications (e.g., with other components of acquisition configuration 100). Streamer vessel 130 may be capable of navigating along a nominal survey path while activating its seismic source 324 and/or acquiring streamer receiver data according to a nominal survey plan. Streamer vessel 130 may also be capable of recording locations of its propulsion source 322, timing of the activations of its seismic source 324, and/or location, timing, and measurements from streamer receivers on streamers 341. Streamer vessel 130 may also be capable of communicating with other components of acquisition configuration 100, including communications regarding navigation, source activation, and data acquisition. Although illustrated as being closely coupled, streamer spread 340 may be towed at a distance from source vessel 320. Although illustrated as forming a simple, planar rectangle, it should be understood that streamer spread 340 may include one or more streamer receivers at a variety of depths and/or one or more streamers 341 following various curves or fanning angles, either by design or as a consequence of operational conditions (e.g., water currents).

As illustrated in FIG. 1, the pair of source vessels 120 may operate along substantially orthogonal nominal survey paths. As used herein, a survey path may be made up of one or more sail lines. Typically, sail lines will substantially cross the survey area (e.g., from top to bottom, or from side to side), and the multiple sail lines of a survey path may be substantially parallel to one another. Some survey paths include end-turns that directly connect adjacent sail lines, while other survey paths interleave the sail lines (e.g., adjacent sail lines are separated by two or more end-turns).

When the pair of source vessels 120 operate along substantially orthogonal nominal survey paths, each of the sail lines of one of the source vessels 120 will be substantially orthogonal to each of the sail lines of the other source vessel 120.

Also as illustrated in FIG. 1, the pair of streamer vessels 130 may operate along substantially orthogonal nominal survey paths. In some embodiments, one of the source vessels 120 may operate along a substantially parallel (or anti-parallel) nominal survey path with one of the pair of streamer vessels 130. In some embodiments, one of the source vessels 120 may operate along a skewed nominal survey path (i.e., neither substantially orthogonal nor substantially parallel) relative to one of the pair of streamer vessels 130. In some embodiments, the nominal survey paths of one of the source vessels 120 and one of the streamer vessels 130 may be substantially parallel to the length 106 of the survey area 101 and/or the major axis 102 of the distribution pattern of the ocean bottom receivers 110. In some embodiments, the nominal survey paths of one of the source vessels 120 and one of the streamer vessels 130 may be substantially parallel to the width 108 of the survey area 101 and/or the minor axis 104 of the distribution pattern of the ocean bottom receivers 110. In some embodiments, the nominal survey paths of source vessels 120 and streamer vessels 130 may be coordinated. For example, when one of the source vessels 120 operates along a substantially parallel (or anti-parallel) nominal survey path with one of the pair of streamer vessels 130, the nominal survey path of the source vessel 120 may be staggered between adjacent sail lines of the nominal survey path of the streamer vessel 130. In some embodiments, the nominal survey path of the source vessel 120 may be symmetrically staggered in the middle of the nominal survey path of the streamer vessel 130, such that a sail line of the source vessel 120 may be substantially equidistant from each of two adjacent sail lines of the streamer vessel 130.

Figure 4A:
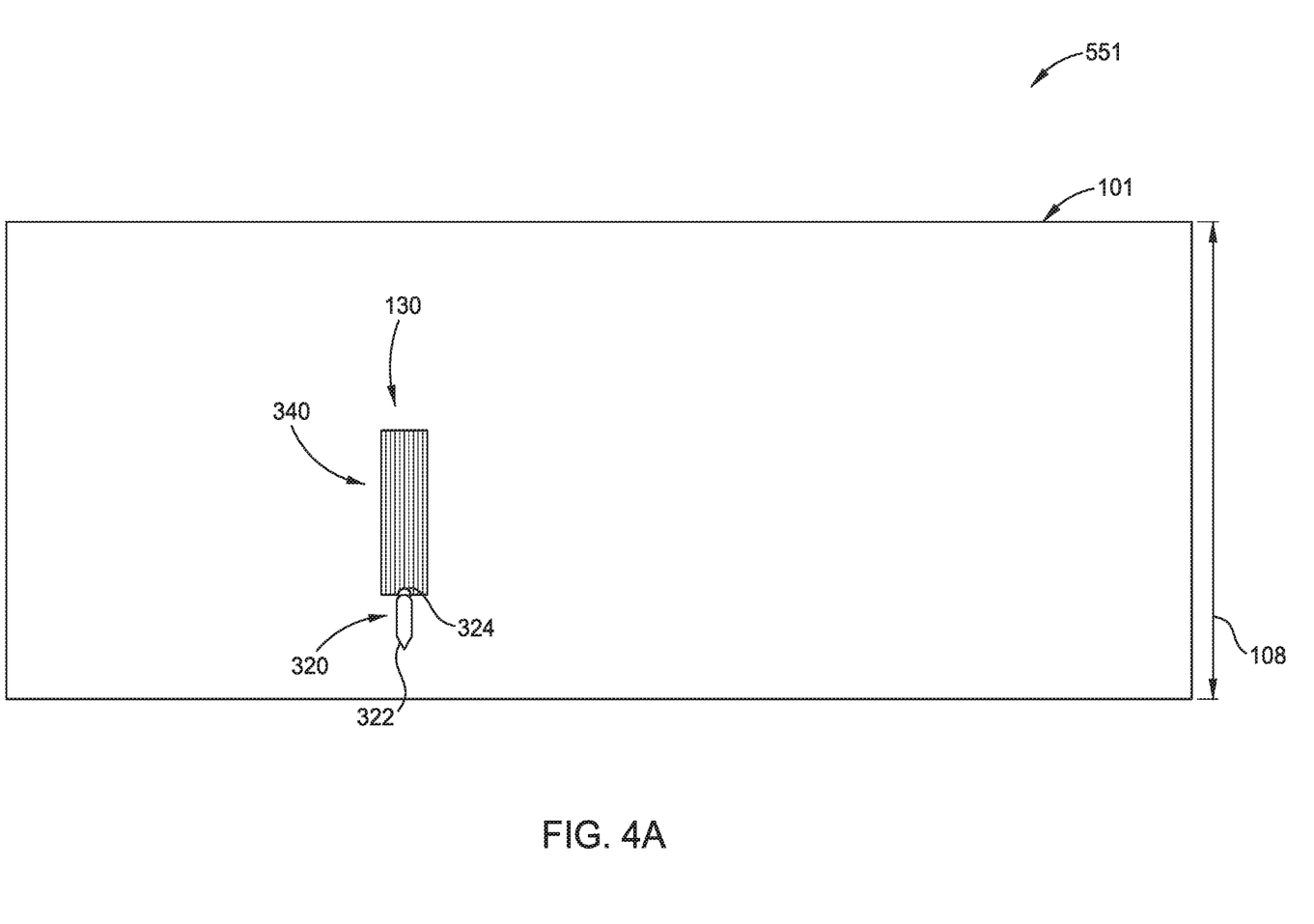
FIGS. 4A-4E illustrate representations of datasets that may be acquired by exemplary data acquisition configuration of FIG. 1.
Figure 4B:
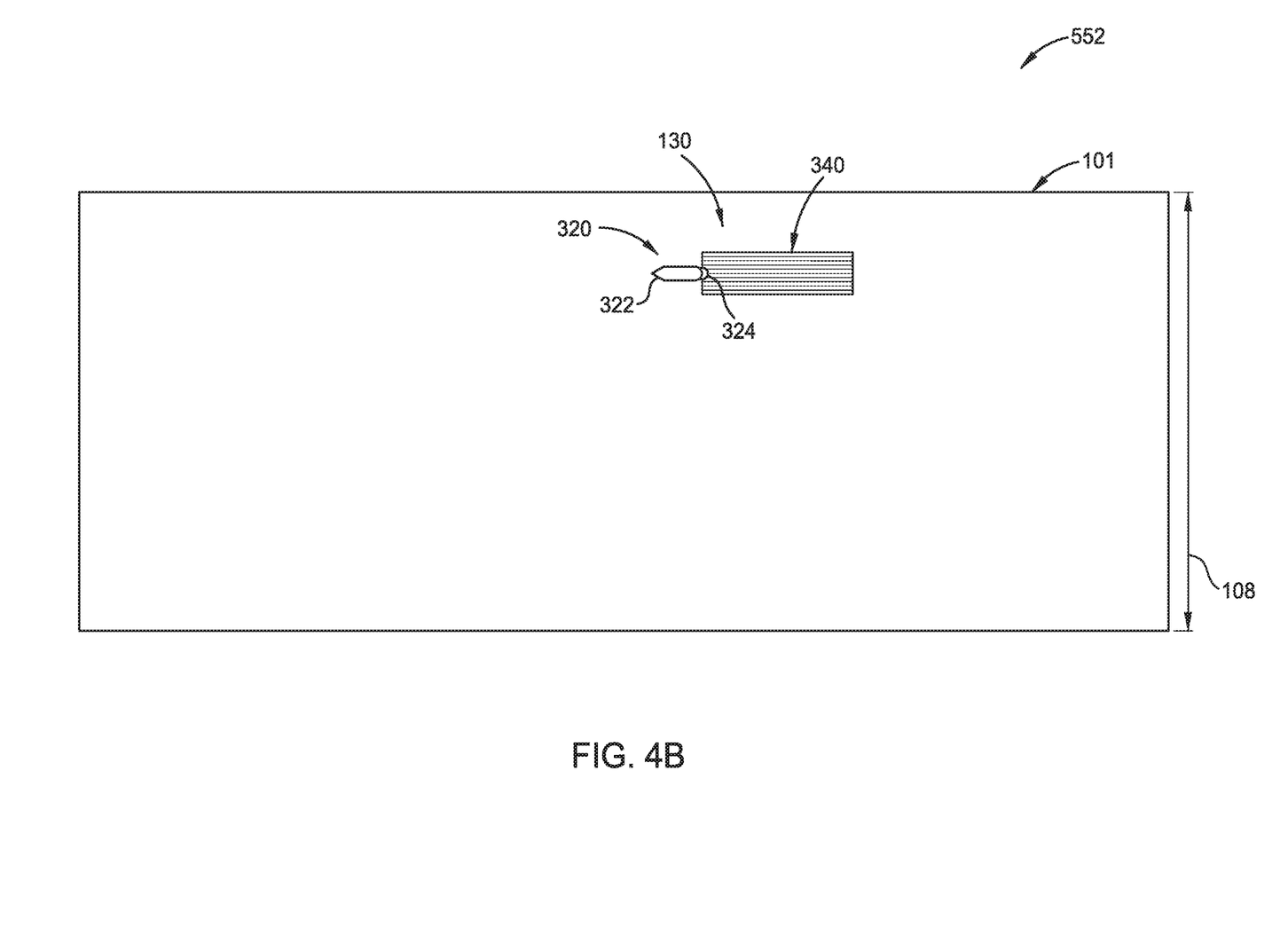

As would be appreciated by one of ordinary skill in the art with the benefit of this disclosure, narrow-azimuth and/or long-offset data may be acquired by streamer receivers in a streamer spread 340 in response to activations of seismic source 324 on the same source vessel 320 that tows the streamer spread 340 (as illustrated in FIGS. 4A and 4B). As would be appreciated by one of ordinary skill in the art with the benefit of this disclosure, random-azimuth and/or variable-offset data may be acquired by streamer receivers in a streamer spread 340 in response to activations of one or more seismic sources 224 on source vessels 120 and/or seismic source 324 on a different source vessel 320 than that which tows the streamer spread 340 (as illustrated in FIGS. 4C and 4D).

Figure 4C:
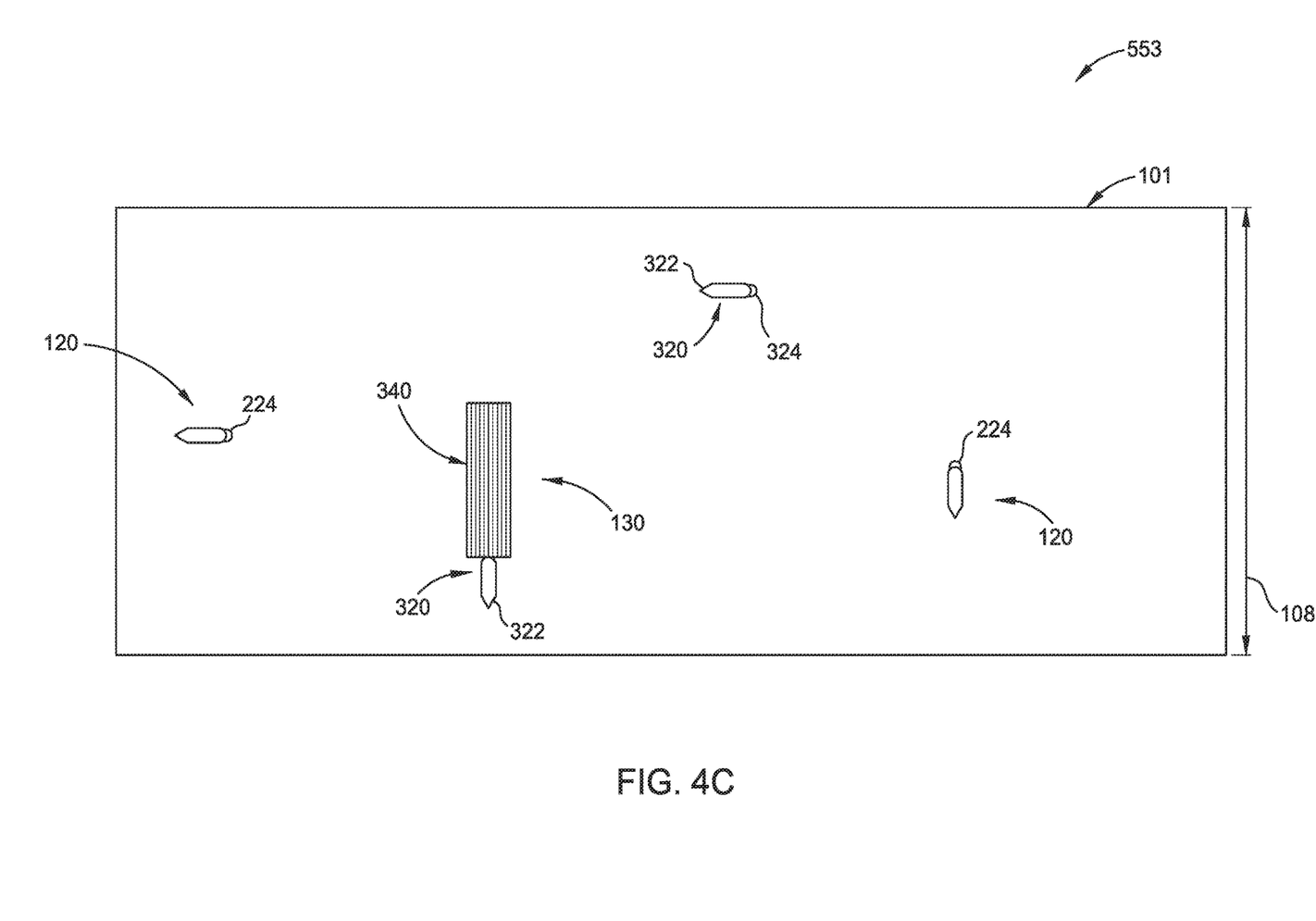
Figure 4D:
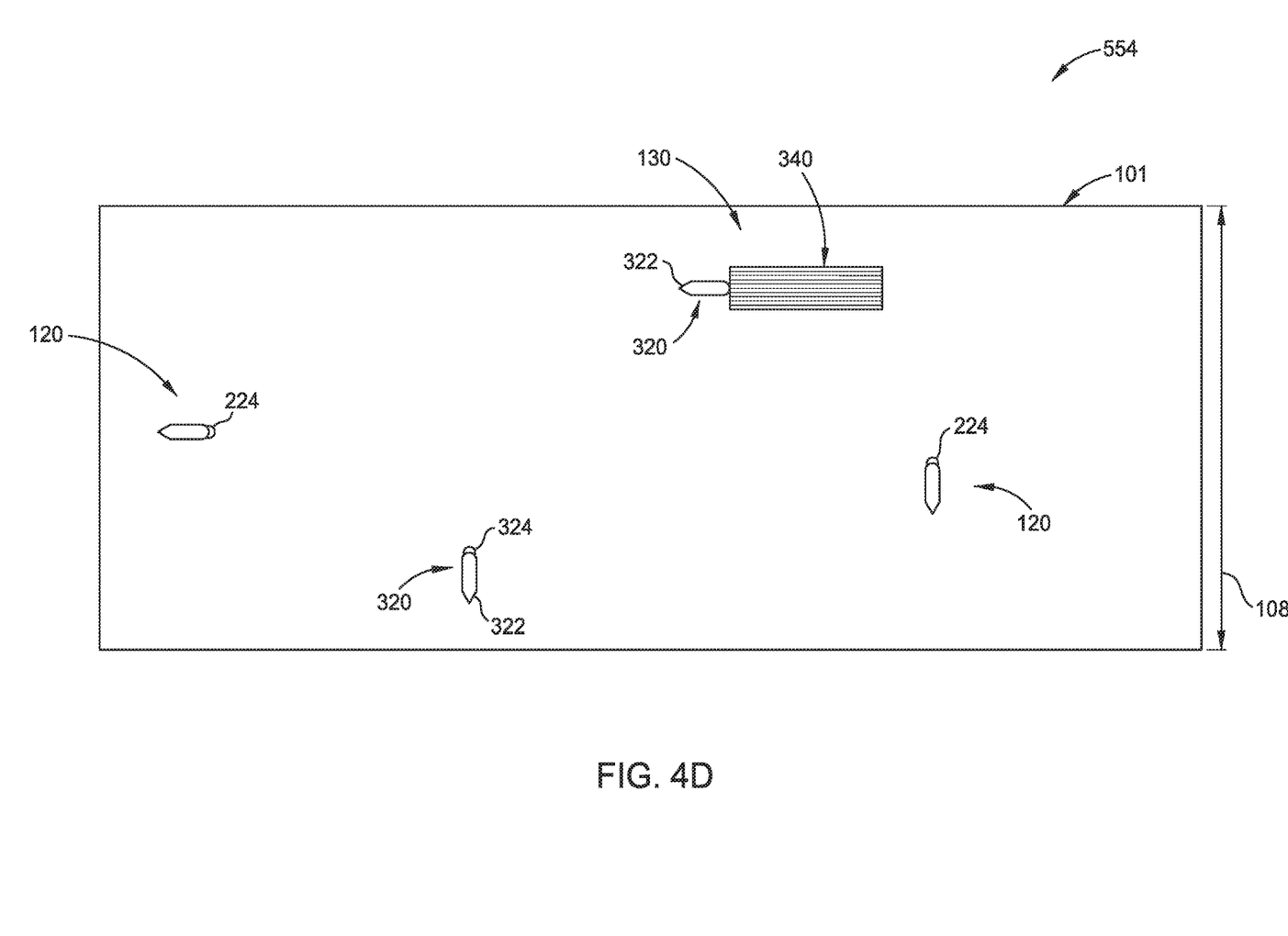
Figure 4E:
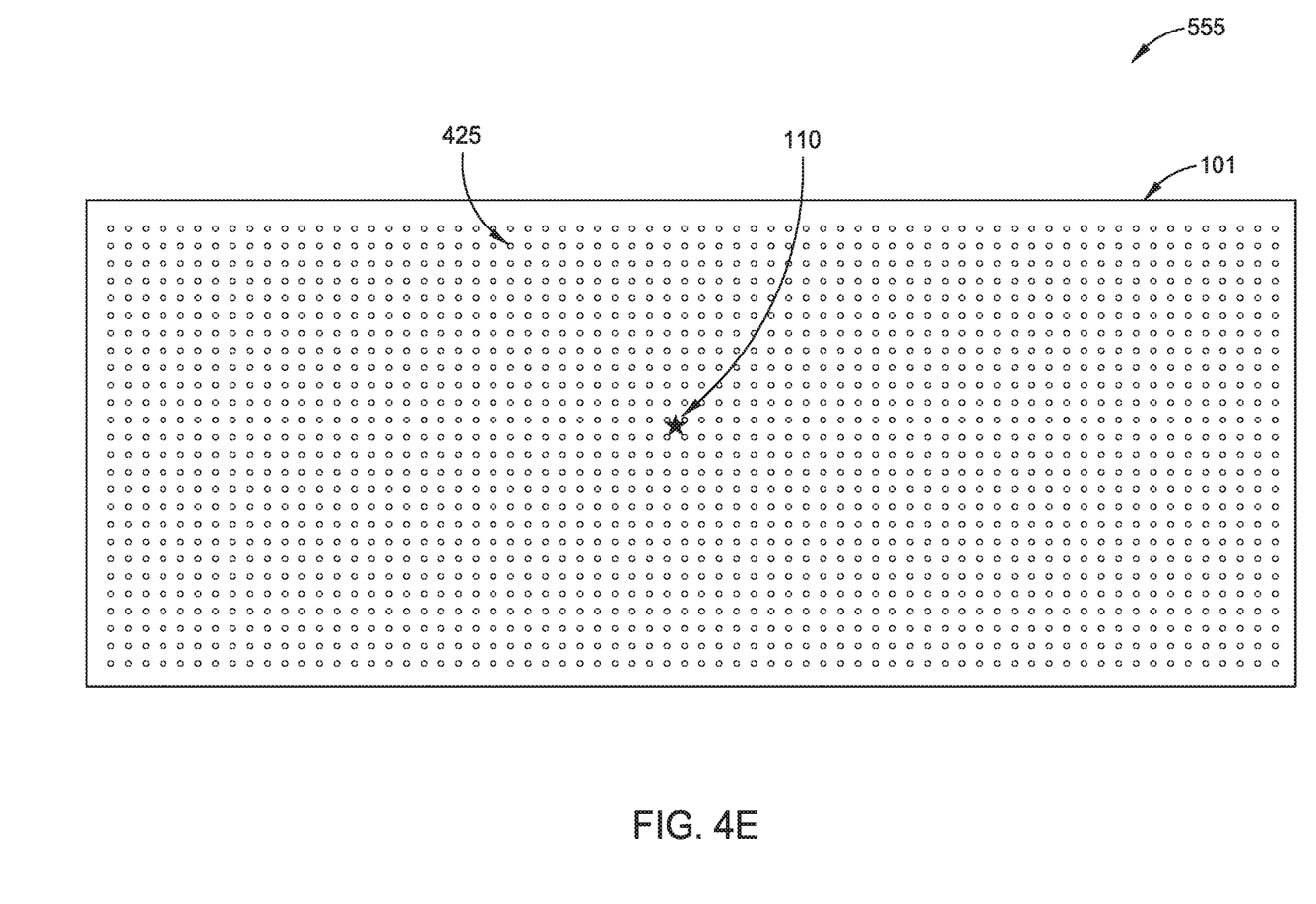

FIGS. 4A-4E illustrate representations of datasets that may be acquired by acquisition configuration 100. FIG. 4A illustrates a representation of a narrow-azimuth and/or long-offset dataset 551 generated by activations of seismic source 324 and measurements by streamer receivers in streamer spread 340 while source vessel 320 tows streamer spread 340. The streamer vessel 130 in FIG. 4A follows a nominal survey path that is parallel to width 108 of survey area 101. FIG. 4B illustrates a representation of another narrow-azimuth and/or long-offset dataset 552 generated by activations of another seismic source 324 and measurements by streamer receivers in another streamer spread 340 while the source vessel 320 tows the streamer spread 340. The streamer vessel 130 in FIG. 4B follows a nominal survey path that is orthogonal to width 108 of survey area 101. FIG. 4C illustrates a representation of a random-azimuth and variable-offset dataset 553 generated by activations of two seismic sources 224 (on two different source vessels 120) and one seismic source 324 (on a non-towing source vessel 320) and measurements by streamer receivers in streamer spread 340 while towing source vessel 320 (remote from the seismic source 324) tows streamer spread 340. The streamer vessel 130 in FIG. 4C follows a nominal survey path that is parallel to width 108 of survey area 101. FIG. 4D illustrates a representation of another random-azimuth and variable-offset dataset 554 generated by activations of the two seismic sources 224 (as in FIG. 4C) and one other seismic source 324 (on another non-towing source vessel 320) and measurements by streamer receivers in another streamer spread 340 while another towing source vessel 320 (remote from the other seismic source 324) tows another streamer spread 340. The streamer vessel 130 in FIG. 4D follows a nominal survey path that is orthogonal to width 108 of survey area 101. It should be appreciated that datasets 553 and 554 will have about three-times more source activations than datasets 551 and 552. It should be appreciated that datasets 551, 552, 553, and 554 may be well-suited, individually or collectively, to generating an image of the subsurface below survey area 101. FIG. 4E illustrates a representation of a dataset 555 that is generated by activations of any of the seismic sources 224, 324 (as shown in FIGS. 4C and 4D) at a plurality of shot points 425 and measurements by any of the ocean bottom receivers 110 (only one shown for clarity). It should be appreciated that dataset 555 may be well-suited to generating a velocity model of the subsurface below survey area 101.

Acquisition configuration 100 provides an example of a Complete Velocity Modeling and Imaging Acquisition (CVMIA) survey configuration. CVMIA survey configurations may optimally acquire data across a survey area 101 while managing data acquisition costs, CVMIA survey configurations may result in at least five datasets, including: two different narrow-azimuth and long-offset datasets 551 552 (as illustrated in FIGS. 4A and 4B), two different random-azimuth and variable-offset datasets 553, 554 (as illustrated in FIGS. 4C and 4D), and one full-area/time dataset 555 (as illustrated in FIG. 4E). In some embodiments, the two different narrow-azimuth and long-offset datasets are generated by simultaneously operating two streamer vessels 130 along orthogonal nominal survey paths, one of which is parallel to a length 106 of the survey area 101. In some embodiments, the two different random-azimuth and variable-offset datasets are generated by simultaneously operating a first source vessel 120 along a nominal survey path parallel to that of one of the streamer vessels 130, and also simultaneously operating a second source vessel 120 along a nominal survey path parallel to that of the other streamer vessel 130. In some embodiments, the full-area/time dataset is generated by deploying a plurality of ocean bottom receivers 110 across the survey area 101 in a distribution pattern having at least one axis of symmetry, and operating at least one propulsion source 222, 322 with a seismic source 224, 324 along a nominal survey path that is parallel to a length 106 of the survey area 101. In some embodiments, the length 106 of the survey area 101 may be parallel to the axis of symmetry of the distribution pattern of the plurality of ocean bottom receivers 110. To optimally acquire seismic data, each of the at least five datasets of a CVMIA survey configuration may be acquired simultaneously. For example, a single activation of any one of the seismic sources 224, 324 in the CVMIA survey configuration may generate data in at least three of the at least five datasets. As another example, a single receiver (either an ocean bottom receiver 110 or a streamer receiver) may measure energy resulting from activation of each of the seismic sources 224, 324 in the CVMIA survey configuration, thereby acquiring data for multiple datasets simultaneously or near-simultaneously. To optimally acquire seismic data, each of the seismic sources 224, 324 of a CVMIA survey configuration may be activated individually and/or independently. For example, the planned and/or actual timing of activation of one seismic source 224, 324 of a CVMIA survey configuration may be independent of the planned and/or actual timing of activation of each of the other seismic sources 224, 324 of the CVMIA survey configuration. In some embodiments, activation of each of the seismic sources 224, 324 of a CVMIA survey configuration may be coordinated, either according to a coordinated nominal survey plan or coordinated by communications between the seismic sources 224, 324 during the survey. To optimally acquire seismic data, each of the propulsion sources 222, 322 of a CVMIA survey configuration may be navigated individually and/or independently. For example, the planned and/or actual navigation of one propulsion source 222, 322 of a CVMIA survey configuration may be independent of the planned and/or actual navigation of each of the other propulsion sources 222, 322 of the CVMIA survey configuration. It should be understood that operational conditions may dictate brief periods of coordinated source activation and/or propulsion source 222, 322 navigation (e.g., avoidance of marine mammal disturbance, avoidance of vessel collisions, etc.).

In some embodiments, each of the vessels (source vessels 120 and streamer vessels 130) may follow an independent nominal survey plan. Each of the nominal survey plans may include nominal survey paths starting at different locations and/or include different navigational inputs. Each of the vessels (source vessels 120 and streamer vessels 130) may operate at different speeds and or headings based on its nominal survey plan and/or navigational inputs. In some embodiments, each of the nominal survey plans may include a sail line spacing S, which may be about half of the width 348 of the streamer spread 340. In some embodiments, each of the nominal survey plans may include a source-activation spacing s, which may be a function of sail line spacing. (As used herein, source-activation spacing is the distance a seismic source travels along a sail line between consecutive activations.) In some embodiments, wherein the nominal survey plan of a source vessel 120 has a nominal survey path parallel to that of a streamer vessel 130, the nominal survey plans may include a nominal survey path for the source vessel 120 that is staggered in the middle of the nominal survey path of the streamer vessel 130, creating a shot patch of half the sail line spacing (S/2) in both directions. In some embodiments, each of the nominal survey plans may include starting locations and/or navigation speeds that are selected to improve and/or maximize the data generated by activation of seismic sources 224 on the source vessels 120.

In some embodiments, each of the vessels (source vessels 120 and streamer vessels 130) may follow a coordinated nominal survey plan. In some embodiments, each of the vessels 120, 130 may be capable of communicating with other components of acquisition configuration 100, including communications regarding navigation and/or source activation. Each of the vessels 120, 130 may operate at coordinated speeds and or headings based on its nominal survey plan and/or navigational inputs. In some embodiments, navigation of each of the vessels 120, 130 may be coordinated, either according to a coordinated nominal survey plan or coordinated by communications between the vessels during the survey.

The methods and systems described herein may be used to manufacture a geophysical data product indicative of certain properties of a subterranean formation. The geophysical data product may include, for example, geophysical data such as pressure data, particle motion data, particle velocity data, particle acceleration data, and any seismic image that results from using the methods and systems described above. The geophysical data product may include, for example, measurements made by the streamer receivers and/or ocean bottom receivers 110, navigation and/or source activation records, and/or datasets 551-555. The geophysical data product may be stored on a non-transitory computer-readable medium as described above. The geophysical data product may be produced offshore (i.e., by equipment on the streamer vessel 130) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

While the foregoing is directed to embodiments of the present disclosure, other and further embodiments of the disclosure may be devised without departing from the basic scope thereof, and the scope thereof is determined by the claims that follow.

The invention claimed is:

1. A method of seismic data acquisition comprising:
    acquiring, with a first seismic source comprising an air gun, a first set of seismic data for a survey area with a first plurality of streamer receivers on a first streamer spread, wherein acquiring the first set of seismic data comprises:
        navigating a first propulsion source along a first sail line in the survey area, wherein the first seismic source and the first streamer spread are coupled to the first propulsion source;
        activating the first seismic source while navigating the first propulsion source;
        while navigating the first propulsion source, navigating a second propulsion source along a second sail line in the survey area, wherein a second seismic source is coupled to the second propulsion source; and
        activating the second seismic source while navigating the second propulsion source, wherein the first sail line is orthogonal to the second sail line;
    simultaneously acquiring, with the first seismic source, a second set of seismic data for the survey area with a plurality of ocean bottom receivers, wherein the first set of seismic data and the second set of seismic data together form a complete dataset for velocity modeling and imaging; and
    simultaneously acquiring a third set of seismic data for the survey area with a second plurality of streamer receivers on a second streamer spread, wherein the second streamer spread is coupled to the second propulsion source.

2. The method of claim 1, wherein the first seismic source comprises two independently-activated sources of seismic energy.

3. The method of claim 1, wherein the first propulsion source is navigated independently of the second propulsion source.

4. The method of claim 1, wherein the first seismic source is activated independently of the second seismic source.

5. The method of claim 1, further comprising:
while navigating the first propulsion source, navigating a third propulsion source in the survey area, wherein a third seismic source is coupled to the third propulsion source;
activating the third seismic source while navigating the third propulsion source in the survey area;
while navigating the first propulsion source, navigating a fourth propulsion source in the survey area, wherein a fourth seismic source is coupled to the fourth propulsion source,
activating the fourth seismic source while navigating the fourth propulsion source in the survey area, wherein neither the third propulsion source nor the fourth propulsion source is coupled to a streamer spread.

6. The method of claim 5 wherein the first set of seismic data comprises:
a first subset of seismic data acquired with the first plurality of streamer receivers and the first seismic source;
a second subset of seismic data acquired with the first plurality of streamer receivers and the second seismic source; and
a third subset of seismic data acquired with the first plurality of streamer receivers and at least one of:
the second seismic source,
the third seismic source, and
the fourth seismic source.

7. A method of seismic data acquisition comprising:
navigating a first propulsion source along a first nominal survey path in a survey area, wherein:
a first streamer spread and a first seismic source are coupled to the first propulsion source, and
the first seismic source comprises an air gun;
navigating a second propulsion source along a second nominal survey path in the survey area, wherein:
a second seismic source is coupled to the second propulsion source, and
the second seismic source comprises an air gun,
a first sail line of the first nominal survey path is orthogonal to a second sail line of the second nominal survey path, and
a second streamer spread is coupled to the second propulsion source;
while navigating the first propulsion source and the second propulsion source, activating at least one of the first seismic source and the second seismic source; and
acquiring data with a first plurality of receivers on the first streamer spread and with a plurality of ocean bottom receivers distributed throughout the survey area.

8. The method of claim 7, wherein a first sail line of the first nominal survey path is parallel to a line of symmetry of a distribution pattern of the plurality of ocean bottom receivers.

9. The method of claim 7, further comprising:
while navigating the first propulsion source, navigating a third propulsion source along a third nominal survey path in the survey area, wherein a third seismic source is coupled to the third propulsion source; and
activating the third seismic source, wherein a third sail line of the third nominal survey path is parallel to the first sail line.

10. The method of claim 9, further comprising:
while navigating the first propulsion source, navigating a fourth propulsion source along a fourth nominal survey path in the survey area, wherein a fourth seismic source is coupled to the fourth propulsion source; and
activating the fourth seismic source, wherein the third sail line is orthogonal to a fourth sail line of the fourth nominal survey path.

11. The method of claim 9, wherein:
the first sail line is adjacent to a fifth sail line of the first nominal survey path, and
the third sail line is symmetrically staggered between the first sail line and the fifth sail line.

12. A method comprising:
navigating a first propulsion source along a first sail line in a survey area;
acquiring a first dataset with a first plurality of streamer receivers on a first streamer spread responding to activations of a first seismic source, wherein the first streamer spread and the first seismic source are both coupled to the first propulsion source;
while navigating the first propulsion source, navigating a second propulsion source along a second sail line in the survey area, wherein the first sail line is orthogonal to the second sail line;
acquiring a second dataset with a second plurality of streamer receivers on a second streamer spread responding to activations of a second seismic source, wherein the second streamer spread and the second seismic source are both coupled to the second propulsion source;
acquiring a third dataset with the first plurality of streamer receivers responding to activations of at least one of:
the second seismic source;
a third seismic source coupled to a third propulsion source; and
a fourth seismic source coupled to a fourth propulsion source;
acquiring a fourth dataset with the second plurality of streamer receivers responding to activations of at least one of:
the first seismic source;
the third seismic source; and
the fourth seismic source; and
acquiring a fifth dataset with a plurality of ocean bottom receivers responding to activations of at least one of:
the first seismic source;
the second seismic source;
the third seismic source; and
the fourth seismic source.

13. The method of claim 12, wherein the first dataset, the second dataset, the third dataset, the fourth dataset, and the fifth dataset are acquired simultaneously.

14. The method of claim 12, wherein:
a geophysical data product comprises the first dataset, the second dataset, the third dataset, the fourth dataset, and the fifth dataset, and
the method further comprises recording the geophysical data product on one or more non-transitory, tangible computer-readable media.

15. The method of claim 12, wherein:
the first dataset and the second dataset contain narrow-azimuth/long-offset data,
the third dataset and the fourth dataset both contain random-azimuth/variable-offset data, and
the fifth dataset contains full-area/time data.

16. The method of claim 12, wherein one activation of the first seismic source generates data in each of the first dataset, the fourth dataset, and the fifth dataset.

17. The method of claim 12, further comprising:
generating an image of a subsurface of the survey area with at least one of:
the first dataset;
the second dataset;
the third dataset; and
the fourth dataset; and
generating a velocity model of the subsurface with the fifth dataset.

18. A method comprising:
navigating a first propulsion source along a first sail line in a survey area;
acquiring a first dataset with a first plurality of streamer receivers on a first streamer spread responding to activations of a first seismic source, wherein the first streamer spread and the first seismic source are both coupled to the first propulsion source;
while navigating the first propulsion source, navigating a second propulsion source along a second sail line in the survey area, wherein the first sail line is orthogonal to the second sail line;
while acquiring the first dataset, acquiring a second dataset with a second plurality of streamer receivers on a second streamer spread responding to activations of the first seismic source, wherein the second streamer spread is coupled to the second propulsion source; and
while acquiring the first dataset and the second dataset, acquiring a third dataset with a plurality of ocean bottom receivers responding to activations of the first seismic source.

* * * * *